(12) United States Patent
Chon et al.

(10) Patent No.: US 8,936,711 B2
(45) Date of Patent: Jan. 20, 2015

(54) METHOD OF EXTRACTING LITHIUM WITH HIGH PURITY FROM LITHIUM BEARING SOLUTION BY ELECTROLYSIS

(71) Applicant: Research Institute of Industrial Science & Technology, Pohang (KR)

(72) Inventors: Uong Chon, Pohang-si (KR); Ki Hong Kim, Pohang-si (KR); Oh Joon Kwon, Pohang-si (KR); Chang Ho Song, Incheon (KR); Gi Chun Han, Cheongju-si (KR); Ki Young Kim, Yongin-si (KR)

(73) Assignee: Research Institute of Industrial Science & Technology, Pohang (KR)

( * ) Notice: Subject to any disclaimer, the term of this patent is extended or adjusted under 35 U.S.C. 154(b) by 0 days.

(21) Appl. No.: 13/761,649

(22) Filed: Feb. 7, 2013

(65) Prior Publication Data

US 2013/0146476 A1 Jun. 13, 2013

Related U.S. Application Data

(63) Continuation of application No. PCT/KR2011/005961, filed on Aug. 12, 2011.

(30) Foreign Application Priority Data

| Aug. 12, 2010 | (KR) | 10-2010-0077946 |
| Dec. 7, 2010 | (KR) | 10-2010-0124090 |
| Dec. 7, 2010 | (KR) | 10-2010-0124091 |

(51) Int. Cl.
*C25B 1/16* (2006.01)
*C01B 25/30* (2006.01)
(Continued)

(52) U.S. Cl.
CPC ............... *C22B 26/12* (2013.01); *C01B 25/306* (2013.01); *C01P 2006/80* (2013.01); *C25C 1/02* (2013.01); *C01B 25/305* (2013.01); *C01B 25/30* (2013.01)
USPC ............................ 205/510; 205/560; 205/770

(58) Field of Classification Search
USPC ............ 423/179.5, 658.5, 180, 181; 205/407, 205/510, 560, 770
See application file for complete search history.

(56) References Cited

U.S. PATENT DOCUMENTS

| 3,007,771 | A | * | 11/1961 | Mazza et al. | ............... | 423/179.5 |
| 3,044,850 | A | * | 7/1962 | Denton | .......................... | 423/313 |

(Continued)

FOREIGN PATENT DOCUMENTS

| CN | 1269430 | 10/2000 |
| CN | 1369023 | 9/2002 |

(Continued)

OTHER PUBLICATIONS

Prescott, A.B. and Johnson, O.C. "Qualitative Chemical Analysis: A guide in the practical study of chemistry and in the work of analysis." (no month) 1890. D. Van Nostrand Company. pp. 24-25 and 221-225.*

(Continued)

*Primary Examiner* — Keith Hendricks
*Assistant Examiner* — Steven A. Friday
(74) *Attorney, Agent, or Firm* — Lexyoume IP Meister, PLLC.

(57) ABSTRACT

The present invention relates to a method of extracting lithium with high purity from a lithium bearing solution by electrolysis. More specifically, the present invention provides a method of economical extraction of lithium from the lithium bearing solution by adding a phosphorous supplying material to the solution to prepare a lithium phosphate aqueous solution subject to electrolysis.

17 Claims, 12 Drawing Sheets

(51) Int. Cl.
  *C22B 26/12* (2006.01)
  *C25C 1/02* (2006.01)

(56) References Cited

U.S. PATENT DOCUMENTS

| | | | |
|---|---|---|---|
| 3,951,766 A * | 4/1976 | Cook, Jr. | 205/535 |
| 4,167,458 A | 9/1979 | Louzos et al. | |
| 4,661,218 A * | 4/1987 | Oda et al. | 205/524 |
| 4,804,448 A | 2/1989 | Sammells | |
| 4,988,417 A | 1/1991 | De Young | |
| 6,322,690 B1 * | 11/2001 | Hammer-Olsen et al. | 205/466 |
| 2006/0144701 A1 * | 7/2006 | Kelly | 204/267 |
| 2008/0245671 A1 * | 10/2008 | Balagopal et al. | 205/510 |
| 2013/0121899 A1 * | 5/2013 | Chon et al. | 423/179.5 |
| 2013/0129586 A1 * | 5/2013 | Chon et al. | 423/179.5 |

FOREIGN PATENT DOCUMENTS

| | | |
|---|---|---|
| CN | 1873056 | 12/2006 |
| JP | 08-213008 | 8/1996 |
| JP | 2002-088420 | 3/2002 |
| JP | 2002-231221 | 8/2002 |
| JP | 2003-049291 | 2/2003 |
| JP | 2004-218078 | 8/2004 |
| JP | 2009-269810 | 11/2009 |
| JP | 2009-270188 | 11/2009 |
| JP | 2010-265142 | 11/2010 |
| KR | 10-2004-0069388 | 8/2004 |

OTHER PUBLICATIONS

Chinese Patent Office, Search Report dated Sep. 28, 2014, which was attached to the Office Action dated Oct. 21, 2014, of the corresponding Chinese Patent Application No. 201180043520.5.

* cited by examiner

METHOD OF EXTRACTING LITHIUM WITH HIGH PURITY FROM LITHIUM BEARING SOLUTION BY ELECTROLYSIS

CROSS-REFERENCE TO RELATED APPLICATIONS

This application is a continuation of International Application No. PCT/KR2011/005961 filed on Aug. 12, 2011, which claims priority to Korean Patent Application No. 10-2010-0077946, filed on Aug. 12, 2010; Korean Patent Application No. 10-2010-0124090, filed on Dec. 7, 2010; and Korean Patent Application No. 10-2010-0124091, filed on Dec. 7, 2010, the entire contents of each which are incorporated herein by reference.

TECHNICAL FIELD

The present invention relates to a method of extracting lithium with high purity from a lithium bearing solution by electrolysis.

BACKGROUND ART

The application of lithium currently extends to diverse industries, including the rechargeable battery, glass, ceramic, alloy, lubricant, and pharmaceutical industries. The lithium rechargeable battery has recently been receiving attention as a main power source for hybrid and electric cars, and the market for lithium rechargeable batteries for cars is expected to continue growing to approximately one-hundred times the conventional compact battery markets for cell phones and notebooks.

In addition, a global movement towards more stringent environmental regulations is likely to expand the application of lithium to not only the hybrid and electric car industries, but to the electrical, chemical and energy fields as well. Thus, a dramatic increase of both domestic and foreign demand for lithium is expected.

Some notable main sources for the lithium could be brine containing lithium produced in nature, and a lithium bearing solution supplied from minerals possessing lithium. Such lithium bearing solution, however, contains a substantial amount of impurities, including magnesium, boron and calcium. The extraction of the impurities in advance is considered to be a critical process in order to obtain high purity lithium necessary for preparing a lithium rechargeable battery.

Conventionally, after absorbed on a boron-selective ion exchange resin containing a N-methylglucamine functional group, the boron ions included in a lithium bearing solution are extracted by washing with an acid solution for desorption. The magnesium and calcium ions included in the lithium bearing solution are extracted by adding alkali and precipitating in the form of magnesium hydroxide and calcium hydroxide.

Such method, however, is not suitable for extracting the boron from the lithium bearing solution, because a relatively expensive ion-exchange resin and usage of a variety of chemicals (e.g., substantial amounts of an acid and a base) in the management of the boron-extracting process are required. Further, the loss of lithium is likely to be substantial because the addition of excessive alkali elevates the pH of the lithium bearing solution, which, in turn, causes a negative charge to be built up on the surface of the precipitated magnesium hydroxide and calcium hydroxide, and thus the absorption of positive lithium ions. As a result, the extraction of lithium along with the impurities cannot be avoided.

U.S. Pat. No. 5,219,550 describes a method of eliminating impurities by extracting magnesium and calcium from the brine after the extraction of boron in an organic phase by mixing an organic solvent with lithium bearing brine at a volume ratio from 1:1 to 5:1. This complicated process, however, has some drawbacks, namely environmental pollution caused by using the organic solvent and a substantial loss of lithium due to the uncontrolled pH.

Further, as one of the most economical lithium supplying sources, the concentration of lithium contained in the brine ranges from approximately 0.3 to 1.5 g/L, and lithium contained in the brine is usually extracted in the form of lithium carbonate having a solubility of about 13 g/L. Even assuming that lithium contained in the brine is completely converted to lithium carbonate, the concentration of lithium carbonate in the brine is limited to 1.59 to 7.95 g/L (the molecular weight of Li2CO3 is 74, and the atomic weight of Li is 7. If the concentration of lithium is multiplied by 5.3 (74÷14≈5.3), the concentration of lithium carbonate can be estimated). Since most of the lithium carbonate concentration is lower than the solubility of lithium carbonate, the extracted lithium carbonate re-dissolves, and thus there is a problem of the lithium extraction yield being extremely low.

Traditionally, in order to extract lithium carbonate from lithium contained in brine, the brine pumped from the natural salt lake was stored in evaporation ponds and subsequently naturally evaporated outdoors over a long period of time, for instance about one year, to concentrate the lithium by several tenfold. Then, the impurities such as magnesium, calcium, boron were precipitated in order to be removed, and the method required an amount greater than the solubility of lithium carbonate to precipitate.

For instance, Chinese Patent Pub. No. 1,626,443 describes a method of extracting lithium, wherein brine is evaporated and concentrated under solar heat, and the concentrate is subject to repeated electro-dialysis in order to obtain brine containing concentrated lithium with a low amount of magnesium.

Meanwhile, a method of electrolysis is widely utilized to prepare lithium. This method constructs three chambers including acidic, basic, and alkaline chambers by placing a bipolar membrane, an anion exchange membrane, and a cation exchange membrane between an anode and a cathode. A lithium chloride aqueous solution supplied to the basic chamber allows the extraction of hydrochloric acid from the acidic chamber, and lithium hydroxide from the alkaline chamber. Such method, however, involves the addition of lithium chloride which is known to be a highly deliquescent substance, and thus undesirably requires the prevention of moistures absorption during its storage, transfer as well as handling. The task is considered to be very troublesome to lower the productivity and incur unnecessary expenses. Furthermore, a great amount of noxious, and corrosive chlorine gas is produced from the positive electrode. The installment of facilities to collect this chlorine gas for detoxification increases the manufacturing costs. In addition to such noxious gas production, the complex structure of using three chambers further separates the distance between the electrodes, causing higher resistance and power consumption necessary for electrolysis. In order to solve the aforementioned drawbacks, Japanese Patent No. 3,093,421 discloses the utilization of a lithium chloride as an electrolytic bath but a lithium carbonate as an electrolytic material to suppress the production of the chlorine gas. The complete prevention of chlorine production, however, is not achievable because lithium chloride is still used as an electrolytic bath, and thus the corrosion still interferes with preparation of highly purified lithium.

DISCLOSURE

Technical Problem

In accordance with an embodiment of the present invention, a method of economical and efficient extraction of lithium from a lithium bearing solution from which impurities including magnesium, boron, and calcium are cost-effectively removed, and lithium phosphate with a low solubility is precipitated without a drying process may be provided. The method may also utilize a lower electrolytic voltage as well less power consumption due to a simplification of the conventional complex electrolytic device, and may be eco-friendly and because no noxious chlorine gas is generated, avoiding the corrosion of electrolytic devices as well as the establishment of facilities to detoxify the chlorine gas. The method of preparing lithium carbonate with high purity may be further provided.

Technical Solution

In accordance with an embodiment of the present invention, a method of extracting high purity lithium from a lithium bearing solution by electrolysis comprising the steps of: preparing a lithium phosphate aqueous solution from the lithium bearing solution by adding a phosphorous supplying material; and extracting lithium from the lithium phosphate aqueous solution by electrolysis using an electrolytic device comprising an anode and a cathode separated from the anode by a cation exchange membrane may be provided.

In one embodiment of the present invention, subsequent to adding the lithium phosphate aqueous solution at the anode, and de-ionized water in the cathode, current may be applied to move lithium ions separated from the anode towards the cathode for reduction of the lithium ions.

In one embodiment of the present invention, the lithium phosphate aqueous solution may be prepared by dissolving lithium phosphate produced from adding a phosphorous supplying material in the lithium bearing solution in a phosphorous containing aqueous solution.

In one embodiment of the present invention, the electrolysis may be performed under the conditions of current density in the range of 0.01 A/cm2 to 0.075 A/cm2, and electrolytic temperature in the range of 15° C. to 25° C.

In one embodiment of the present invention, the cation exchange membrane may be porous having a pore density of 10% to 50%.

In one embodiment of the present invention, the anode and the cathode during the reduction of the electrolysis may be subject to being under an inert gas environment.

In one embodiment of the present invention, the inert gas may be argon.

In one embodiment of the present invention, the cation exchange membrane may be a polymeric membrane which allows the passage of cations.

In one embodiment of the present invention, the cation exchange membrane may comprise at least one functional group selected from the group consisting of sulfonic acid group, carboxylic acid group, phosphonic acid group, sulfuric ester group, fluorine group and phosphate ester group.

In one embodiment of the present invention, the pH of a lithium ion concentrated solution at the cathode after the electrolysis may exceed 7.

In one embodiment of the present invention, a solution concentrated by the movement of lithium ions towards the cathode may be a lithium hydroxide aqueous solution.

In one embodiment of the present invention, the method may further comprise a step of precipitating followed by extracting lithium carbonate by reacting the lithium hydroxide aqueous solution with carbon dioxide gas or a carbonate bearing material.

In one embodiment of the present invention, the step of preparing a lithium phosphate aqueous solution from the lithium bearing solution by adding a phosphorous supplying material may comprise the steps of: removing impurities comprising a step of adding an alkali in the lithium bearing solution to extract magnesium, boron or a mixture thereof and a step of adding an alkali, a carbonate or a mixture thereof in the lithium bearing solution from which magnesium and boron are extracted to extract calcium; extracting lithium phosphate by adding a phosphorous supplying material to the solution to precipitate lithium phosphate from the dissolved lithium; and preparing the lithium phosphate aqueous solution by dissolving the lithium phosphate in a phosphoric acid.

In one embodiment of the present invention, the step of removing impurities may comprise the steps of: (a) adding an alkali in the lithium bearing solution to precipitate magnesium hydroxide from magnesium; (b) absorbing boron ions on the surface of the magnesium hydroxide by adjusting the pH of the lithium bearing solution to about 8.5 to about 10.5; (c) simultaneously extracting magnesium and boron by filtering the magnesium hydroxide absorbed with the boron ions from the lithium bearing solution; and (d) precipitating calcium hydroxide or calcium carbonate by adding an alkali, a carbonate or mixture thereof in the lithium bearing solution of step (c).

In one embodiment of the present invention, the steps from (a) to (c) may be repeated at least twice.

In one embodiment of the present invention, the step of extracting lithium phosphate by adding a phosphorous supplying material to the solution to precipitate lithium phosphate from the dissolved lithium may minimize the loss of lithium by positively charging the surface charge of the magnesium hydroxide, which allows the absorbance of boron ions having a negative charge to the surface of magnesium hydroxide to prevent the absorbance of positively charged lithium ions.

In one embodiment of the present invention, the pH of the lithium bearing solution of the step (d) may be adjusted to 12 or higher.

In one embodiment of the present invention, the phosphorous supplying material may be at least one selected from the group consisting of phosphorous, phosphoric acid and phosphate.

In one embodiment of the present invention, the concentration of the lithium phosphate may be 0.39 g/L or more.

In one embodiment of the present invention, the concentration of lithium in the lithium bearing solution may be 0.1 g/L or more.

In another embodiment of the present invention, the method may further comprise a step of extracting lithium phosphate by filtering the precipitated lithium phosphate from the lithium bearing solution.

In yet another embodiment of the present invention, the step of extracting lithium phosphate may be performed at room temperature or higher.

Advantageous Effects

In accordance with an embodiment of the present invention, a method of economical and efficient extraction of lithium from a lithium bearing solution from which impurities including magnesium, boron, and calcium are cost-effectively removed, and lithium phosphate with a low solubility is precipitated without a drying process may be provided. The method may also utilize a lower electrolytic voltage as well power consumption via a simplification of the conventional complex electrolytic device, and may be eco-friendly and economical because the noxious chlorine gas is not generated, avoiding the corrosion of electrolytic devices as well as the establishment of facilities to detoxify the chlorine gas. The method of preparing lithium carbonate with high purity may be further provided.

MODE FOR INVENTION

Figure 1:
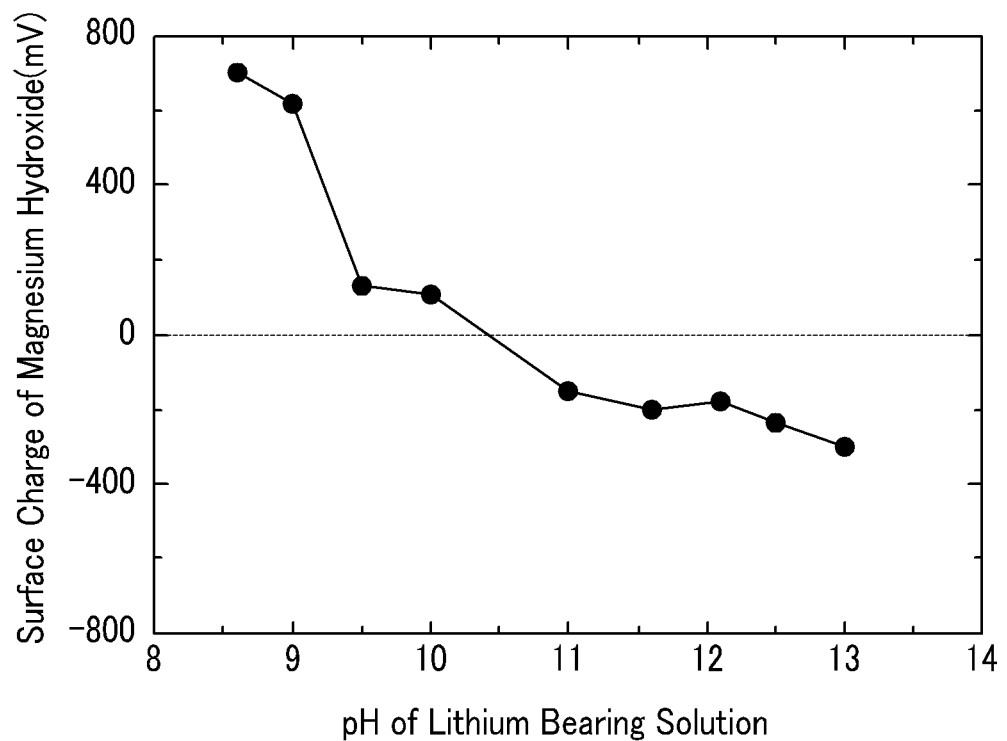
FIG. 1 is a graph depicting the surface charge change of magnesium hydroxide according to the pH of the lithium bearing solution.

The features of one embodiment of the present invention will be described in more detail with reference to the figures as follows.

In accordance with an embodiment of the present invention, a method of extracting high purity lithium from a lithium bearing solution by electrolysis comprising the steps of: preparing a lithium phosphate aqueous solution from the lithium bearing solution by adding a phosphorous supplying material; and extracting lithium from the lithium phosphate aqueous solution by electrolysis using an electrolytic device comprising an anode and a cathode separated from the anode by a cation exchange membrane may be provided. The method may require lower power consumption and prevent the generation of chlorine gas.

Due to its solubility being approximately 13 g/L, a relatively large amount of lithium carbonate (Li2CO3) may be dissolved in the water. It is difficult to extract lithium from a lithium bearing solution, such as brine, because an extremely small concentration of lithium of 0.5 g/L to 1.5 g/L is dissolved. Even if lithium carbonate is produced by adding sodium carbonate to the lithium bearing solution, most of it re-dissolves.

The solubility of lithium phosphate (Li3PO4), however, is approximately 0.39 g/L, which is relatively lower than that of lithium carbonate. Accordingly, it is possible to extract even a small concentration of 0.5 g/L or 1.5 g/L of lithium dissolved in the lithium bearing solution, such as brine, which can be precipitated and separated into lithium phosphate in a solid state by adding a phosphorous supplying material in the lithium bearing solution.

In one embodiment of the present invention, the concentration of lithium in the lithium bearing solution may be 0.1 g/L or more. More specifically, the concentration may be 0.2 g/L or more, or 0.5 g/L or more. The concentration of 60 g/L or more, however, may not be economical because a great amount of time is required for the high-enrichment of lithium.

The phosphorous supplying material selected from the group consisting of phosphorous, phosphoric acid, phosphate, and a mixture thereof is added to the lithium bearing solution to produce lithium phosphate. In addition, in order for the lithium phosphate to be precipitated in a solid state without being re-dissolved, the concentration (i.e., the dissolved concentration in the lithium bearing solution) should be 0.39 g/L or greater.

In the case the phosphorous supplying material is a compound capable of altering the pH of the lithium bearing solution (e.g., phosphoric acid), hydroxide ions can be concurrently used to prevent the precipitated lithium phosphate from re-dissolving once the pH of the solution decreases.

The phosphate may be, for example, but is not limited thereto, potassium phosphate, sodium phosphate, and ammonium phosphate. Specifically, the ammonium may be (NR4)3PO4, wherein R is independently a hydrogen, a heavy hydrogen, a substituted or unsubstituted C1-C10 alkyl group, but not limited thereto.

More specifically, the phosphate may be, for example, but is not limited thereto, mono-potassium phosphate, di-potassium phosphate, tri-potassium phosphate, mono-sodium phosphate, di-sodium phosphate, tri-sodium phosphate, aluminum phosphate, zinc phosphate, poly-ammonium phosphate, sodium-hexa-meta-phosphate, mono-calcium phosphate, di-calcium phosphate, and tri-calcium-phosphate.

The phosphorous supplying material may be water-soluble. In the case the phosphorous supplying material is water-soluble, the reaction with lithium contained in the lithium bearing solution may easily occur.

The precipitated lithium phosphate may be extracted by filtering the lithium bearing solution.

Further, the method of economical extraction of lithium from a lithium bearing solution by adding a phosphorous supplying material to the solution to precipitate lithium phosphate from the dissolved lithium may be performed at room temperature. More specifically, the temperature may be more than 20° C., 30° C., 50° C. or 90° C.

In the present invention, the term "room temperature" is not limited to a definite temperature, and it is construed to mean a temperature without the application of external energy. Accordingly, the room temperature may vary depending on time and place.

In accordance with another embodiment of the present invention, the step of preparing a lithium phosphate aqueous solution from the lithium bearing solution by adding a phosphorous supplying material may comprise the steps of: removing impurities comprising a step of adding an alkali in the lithium bearing solution to extract magnesium, boron or a mixture thereof and a step of adding an alkali, a carbonate or a mixture thereof in the lithium bearing solution from which magnesium and boron are extracted to extract calcium; extracting lithium phosphate by adding a phosphorous supplying material to the solution to precipitate lithium phosphate from the dissolved lithium; and preparing the lithium phosphate aqueous solution by dissolving the lithium phosphate in a phosphoric acid.

Each of the aforementioned steps will be described in more details as follows.

[Step of Removing Impurities]

Figure 12:
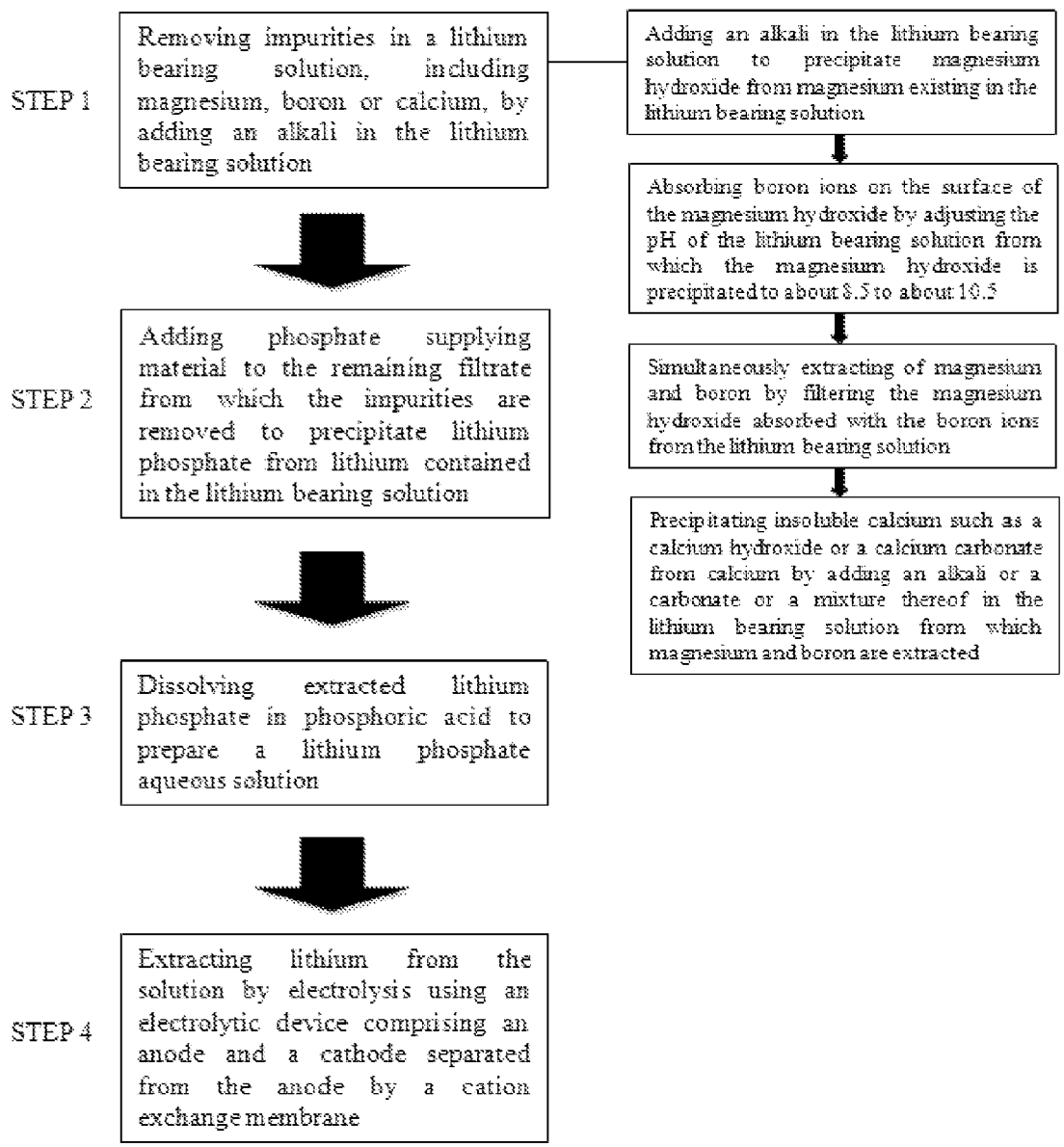
FIG. 12 is a flowchart showing a method of extracting lithium from a lithium bearing solution with high purity by electrolysis according to one embodiment of the present invention.

As shown in the flowchart in FIG. 12, according to one embodiment of the present invention, a step of removing impurities in a lithium bearing solution, including magnesium, boron or calcium, by adding an alkali in the lithium bearing solution (e.g., brine) may be performed (STEP 1).

The step (a) of the present invention involves adding an alkali selected from the group consisting of NaOH, Ca(OH)2, NH4OH, R4NOH.5H2O and a mixture thereof in the lithium bearing solution to precipitate magnesium hydroxide from magnesium existing in the lithium bearing solution, wherein R is independently a C1-C10 alkyl group such as methyl, ethyl, propyl or butyl. In other words, in order to raise the pH of the lithium bearing solution, the magnesium ions existing in a dissolved state are precipitated into a magnesium hydroxide by the addition of the alkali.

As one specific example, the step stated above assumes that the lithium bearing solution contains impurities. As a more specific example, in a case in which the lithium bearing solution is brine, which includes impurities such as magnesium, boron and calcium, the magnesium ions existing in a dissolved state in the brine are precipitated into a magnesium hydroxide by the addition of the alkali in the brine. The magnesium hydroxide is characterized in having a low solubility of 0.009 g/L, and has a tendency to easily precipitate in a basic solution having a pH of 8 or higher.

The alkali includes a hydroxide negative ion. The positive ion of the alkali, which may be an environmental-friendly material, may have a very high solubility with respect to the lithium bearing solution. If the solubility of the positive ion is low, the alkali may be mixed with either the extracted magnesium or boron, which may subsequently require an additional separation process.

Further, the step (b) involves absorbing boron ions on the surface of the magnesium hydroxide by adjusting the pH of the lithium bearing solution from which the magnesium hydroxide is precipitated to about 8.5 to about 10.5.

According to one embodiment of the present invention, in order to simultaneously extract magnesium and boron from the lithium bearing solution, the surface charge of the magnesium hydroxide is utilized. In general, the surface charge of the magnesium hydroxide is greatly influenced by the pH of the solution. When the surface charge of the magnesium hydroxide is positive, the boron ions existing in the form of a negative ion, such as H2BO3- or HBO32- are absorbed on the magnesium hydroxide, and the magnesium and boron dissolved in the lithium bearing solution can be removed by simultaneous extraction. When the surface charge of the magnesium hydroxide is negative, however, the negatively charged boron ions are not absorbed on the magnesium hydroxide.

It is preferable to adjust the pH of the lithium bearing solution from which the magnesium hydroxide is precipitated to about 8.5 to about 10.5. If the pH is below 8.5, the removal efficiency of magnesium will decline because a relatively low pH results in an insufficient amount of precipitated magnesium hydroxide from magnesium ions dissolved in the lithium bearing solution. On the other hand, if the pH exceeds 10.5, as seen in FIG. 1, the surface charge of magnesium hydroxide would be negatively charged, and the boron ions cannot be absorbed thereon. Consequently, the absorbance of positively charged lithium ions will lead to a substantial loss of lithium.

In order to maintain the pH level mentioned above, the alkali may be added to the lithium bearing solution in phases. In this case, the magnesium hydroxide production rate as well as pH change rate can be controlled by alkali addition.

After absorbing the boron ions on the surface of the magnesium hydroxide, the step (c) involving a simultaneous extraction of magnesium and boron by filtering the magnesium hydroxide absorbed with the boron ions from the lithium bearing solution may be performed. In other words, the filtration step is performed to separate the lithium bearing solution from the precipitated magnesium hydroxide absorbed with the boron ions. This allows the extraction of magnesium and boron, and the remaining filtrated lithium bearing solution is obtained.

It is preferable to repeatedly perform the steps (a) to (c) at least twice, more specifically two or three times, prior to performing the step (d). If the steps from (a) to (c) are performed only once to simultaneously extract the magnesium and boron, the extraction efficiency of magnesium or boron would be lower due to an excess addition of the alkali and difficulty in controlling the pH. If the steps are performed more than three times, it would be cost-ineffective.

The step (d) involves precipitating insoluble calcium such as a calcium hydroxide or a calcium carbonate from calcium by adding an alkali or a carbonate or a mixture thereof in the lithium bearing solution from which magnesium and boron are extracted. In order to extract the most calcium ions included in the lithium bearing solution, the pH is preferably maintained to be at least 12.

Since OH— supplied from the addition of the alkali is used up in the production of calcium hydroxide, a significant amount of alkali is added in order to maintain the pH level of the lithium bearing solution to be at least 12. When the calcium carbonate is added alone or in combination with the alkali, the pH could be economically maintained at at least 12 even if the amount of alkali could be relatively reduced.

The alkali is selected from the group consisting of NaOH, Ca(OH)2, NH4OH, R4NOH.5H2O and a mixture thereof, wherein R is independently a C1-C10 alkyl group such as methyl, ethyl, propyl or butyl. The carbonate is selected from the group having high solubility consisting of Na2CO3, K2CO3, and a mixture thereof. The alkali or the carbonate precipitates calcium carbonate or calcium hydroxide from calcium.

According to another embodiment of the present invention, a step of extracting calcium by filtering the precipitated calcium hydroxide or calcium carbonate may be further included. Such step can be performed according a well-known method in the art.

[Step of Precipitating and Extracting Lithium Phosphate]

A phosphate supplying material may be added to the remaining filtrate from which the impurities are removed to precipitate lithium phosphate from lithium contained in the lithium bearing solution (Step 2).

The step of removing impurities, however, may be optionally performed prior to adding the phosphorous supplying material. Alternatively, the step of removing impurities may be performed subsequent to adding the phosphorous supplying material. In other words, the step of removing impurities may not be necessarily performed. As a specific example, if a lithium bearing solution without impurities is used to extract lithium, the step of removing impurities may be omitted, and the phosphorous supplying material may be added to the lithium bearing solution.

The step of precipitating lithium phosphate from the lithium bearing solution may be performed at room temperature or above, or at 40° C. or above. More specifically, the step may be performed at 50° C. or above, 60° C. or above, 70° C. or above, 80° C. or above, or 90° C. or above.

The phosphorous supplying material may be selected from the group consisting of phosphorous, phosphoric acid, phosphate, and a mixture thereof.

In order for the lithium phosphate to be precipitated in a solid state without being re-dissolved, the concentration (i.e., the dissolved concentration in the lithium bearing solution) should be 0.39 g/L or greater.

The phosphate may be, for example, but is not limited thereto, potassium phosphate, sodium phosphate, and ammonium phosphate. Specifically, the ammonium may be $(NR4)3PO4$, wherein R is independently a hydrogen, a heavy hydrogen, a substituted or unsubstituted $C1-C10$ alkyl group, but not limited thereto.

More specifically, the phosphate may be, for example, but is not limited thereto, mono-potassium phosphate, di-potassium phosphate, tri-potassium phosphate, mono-sodium phosphate, di-sodium phosphate, tri-sodium phosphate, aluminum phosphate, zinc phosphate, poly-ammonium phosphate, sodium-hexa-meta-phosphate, mono-calcium phosphate, di-calcium phosphate, and tri-calcium-phosphate.

The phosphorous supplying material may be water-soluble. In the case the phosphorous supplying material is water-soluble, the reaction with lithium contained in the lithium bearing solution may easily occur.

Further, after the phosphorous supplying material is added, the filtrate is calcinated for 10 to 15 minutes at room temperature, or at a temperature range of 40-200° C., 50-200° C., 60-200° C., 70-200° C., 80-200° C., or 90-200° C.

Although it is advantageous to extend the calcining time and raise the temperature for the purpose of producing lithium phosphate, if the calcining time exceeds 15 minutes or if the calcining temperature exceeds 200° C., the production yield of lithium phosphate may be saturated.

After precipitating lithium phosphate from the lithium bearing solution, the step of extracting the precipitated lithium phosphate filtered from the filtrate may be performed.

Upon such filtration, the extracted lithium phosphate may be washed to obtain high purity lithium phosphate powder.

[Preparation of Lithium Phosphate Aqueous Solution]

Once the lithium phosphate is precipitated and extracted from the lithium bearing solution in Step 2, the extracted lithium phosphate is dissolved in phosphoric acid to prepare a lithium phosphate aqueous solution (Step 3). The extracted lithium phosphate is dissolved in an aqueous solution containing phosphoric acid to increase the solubility and to prepare highly concentrated lithium phosphate aqueous solution later to be added in the anode of the electrolytic device.

[Electrolytic Reduction]

Subsequent to the preparation of the lithium phosphate aqueous solution in Step 3, a step of extracting lithium from the solution by electrolysis using an electrolytic device comprising an anode and a cathode separated from the anode by a cation exchange membrane is performed (Step 4).

As long as the electrolytic method and/or device comprises a cathode, an anode and a cation exchange membrane, the step of performing electrolysis is not restricted by a procedure sequence, the structure or compositions of the device. In one embodiment of the present invention, the structure of the electrolytic device may be in the form of batch, continuous, or circulating type. More specifically, when the circulation type electrolysis is performed, by-products such as excess phosphate ions at the anion can be recycled and added in the subsequent electrolysis. Accordingly, there are economical as well as environmental advantages of minimizing reaction impurities.

Figure 9:
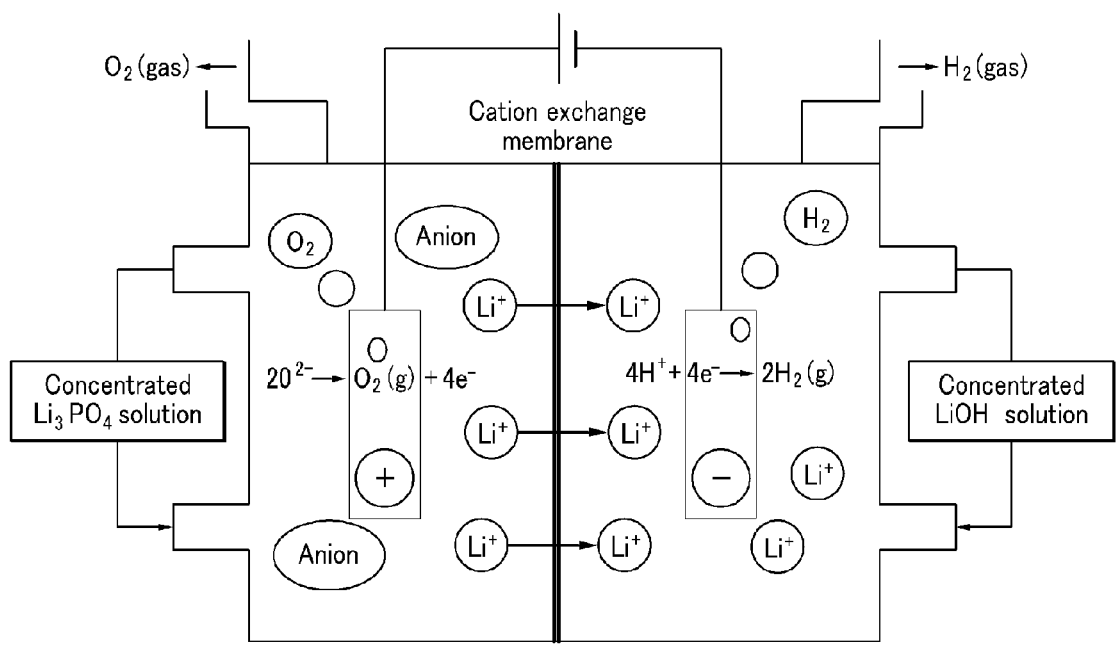
FIG. 9 is a schematic diagram of a method of preparing lithium by an electrolytic device according to one embodiment of the present invention.

According to one embodiment of the present invention, an electrolytic device is explained in reference to FIG. 9.

More specifically, a highly concentrated lithium phosphate aqueous solution may be prepared by dissolving lithium phosphate in the aqueous solution containing phosphoric acid to higher the solubility. Then, an anode with a positive electrode, and a cathode with a negative electrode separated from the anode by a cation exchange membrane may be arranged.

In another embodiment of the present invention, an electrolytic device comprising at least three chambers including acidic, basic, and alkaline chambers may be used. Such complicated structure, however, further separates the distance between the electrodes, causing higher resistance and power consumption necessary for electrolysis.

Moreover, the use of lithium phosphate, as opposed to lithium chloride, in the anode may eliminate the burdensome tasks of storing, transferring as well as handling of lithium chloride, the generation of corrosive chlorine gas at the positive electrode which causes the device corrosion, and the installment of facilities to collect the chlorine gas for detoxication.

The aqueous solution supplied at the cathode may be, for example, de-ionized water. In one embodiment of the present invention, the de-ionized water may contain a small quantity of lithium when supplied at the cathode.

The positive electrode may be, for example, a consumable electrode, which can form an alloy with lithium ions when dissolved by the electrolytic bath of the anode, and thus, a material having low reactivity against the lithium ions may be selected. According to one embodiment of the present invention, a carbon based positive electrode may be prepared so that the consumed carbon can be emitted in the form of carbon dioxide gas, and thereby suppressing the reaction with the lithium ions.

In order to increase the lithium extraction yield, the negative electrode may be also selected materials having low reactivity against lithium ions. The materials for the negative electrode, for example, may be a metal selected from the group consisting iron, nickel, titanium, and stainless, or may comprise a plated layer formed on the surface of the metal selected.

The cation exchange membrane may contact the lithium phosphate aqueous solution at the anode, and de-ionized water at the cathode, and may be a porous material which allows the mobility of lithium ions. The pore density may be between about 10% to about 50%. In case the pore density exceeds 50%, the electrolytic efficiency decreases because the lithium phosphate aqueous solution flows to the cathode from the anode. On the contrary, if the pore density is lower than 10%, the flow of electric current may reduce, and thus the mobility of lithium ions may be lowered.

The cation exchange membrane may be at least one polymeric membrane selected from the group consisting of sulfonic acid group, carboxylic acid group, phosphonic acid group, sulfuric ester group, fluorine group and phosphate ester group. The polymeric membrane enhances the selective permeation of lithium cation and thereby inhibits or blocks the passage of polycations including calcium and magnesium, or anions including phosphate ions.

In one embodiment of the present invention, tanks responsible for supplying the lithium phosphate aqueous solution and de-ionized water to each of anode and cathode of the electrolytic device, respectively, are prepared so that each of the aqueous solutions may circulate. In other words, the electrolysis is performed by connecting each tank with a circulating line(s) and the emitted aqueous solutions circulate into the chambers via each tank. Moreover, the voltage of the anode may be measured. When the measured voltage exceeds the predetermined chamber voltage, this may indicate that the concentration of lithium phosphate aqueous solution supplied at the anode is declined to a point at which it is unsuitable for electrolysis, and new lithium phosphate aqueous solution needs to be added via a supplying line(s).

As shown in FIG. 1, upon adding lithium phosphate aqueous solution at the anode, and de-ionized water at the cathode, the electric current is applied to the electrolytic device. The lithium phosphate aqueous solution is electrolyzed at the anode into lithium ions and phosphate ions. At this point, the lithium ions separated at the anode move towards the cathode through the cation exchange membrane and then are collected as a lithium metal.

According one embodiment of the present invention, the electrolysis is performed under the conditions of current density in the range of 0.01 A/cm2 to 0.075 A/cm2, and electrolytic temperature in the range of 15° C. to 25° C. More preferably, the current density range may be between 0.03 A/cm2 to 0.05 A/cm2. When the electric current is lower than 0.01 A/cm2, the lithium metal collection yield at the negative electrode may be undesirably too low. When the electric current surpasses 0.075 A/cm2, however, there are some disadvantages in that the amount of heat generated would be too high and thus the temperature management of electrolytic bath may become difficult. In addition, the electrolytic temperature is adjusted to be in the range of 3° C. to 75° C. to have superior electric current flow and to prevent the freezing of the electrolytic bath. More preferably, the electrolytic temperature may be in the range of 5° C. to 60° C.

The anode and the cathode during the reduction of the electrolysis may be subject to being under an inert gas environment. Lithium metal is produced and hydrogen gas is emitted at the cathode of the negative electrode, and oxygen gas and in some cases, carbon dioxide gas is emitted at the anode. By controlling the interior atmosphere of anode and cathode to be inert gas environment, the interaction between the cathode and anode may be prevented to exclude a factor that may negatively affect the electrolytic efficiency. In one embodiment of the present invention, the inert gas may be preferably argon.

The oxygen ions of the aqueous solution at the positive electrode become oxygen gas and in turn, discharge electrons. The hydrogen ions of the aqueous solution at negative electrode accept the electrons to generate hydrogen gas. The oxygen and hydrogen gases produced are emitted outside via an outlet located at the upper portion.

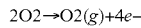       Positive Electrode(+)

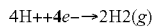       Negative Electrode(−)

As the lithium phosphate aqueous solution is electrolyzed at the anode, and the lithium ions selectively pass through the cation exchange membrane, the concentration of lithium ions gradually decreases, whereas the concentration of phosphate ions increases. Consequently, the pH of the electrolyte gradually decreases.

On the other hand, the concentration of lithium ions that permeate through the cation exchange membrane gradually increases at the cathode. The pH of the electrolyte gradually increases as the hydrogen ions of the aqueous solution are emitted in the form of hydrogen gas, and lithium hydroxide aqueous solution with highly concentrated lithium ions is produced at the cathode.

According to one embodiment of the present invention, the pH of the lithium ion concentrated solution at the cathode after the electrolysis may preferably exceed 7 to maintain the basicity. In a case in which lithium is carbonatized to produce lithium carbonate(Li2CO3), lithium carbonate, even if extracted, re-dissolves if the pH is lower than 7 due to its high solubility. Thus, an alkali such as sodium hydroxide needs to be added for the pH maintenance. In the present invention, however, the carbonatization of lithium is simplified because the pH of the lithium concentrated solution at the cathode after the electrolysis exceeds 7 and maintains the basicity.

When the lithium phosphate aqueous solution is added at the anode for electrolysis, the solution is electrolyzed, resulting in separation of phosphate ions and lithium ions. The lithium ions move towards the cathode via the cation exchange membrane. According to one embodiment of the present invention, as the anode includes the phosphate ions, the collected lithium phosphate may be directly added to the anode to produce lithium phosphate aqueous solution. Thus, it would be unnecessary to separately prepare a lithium aqueous solution by dissolving lithium phosphate in phosphoric acid, as described in Step 3, but instead, lithium phosphate can be directly added to the cathode for lithium extraction by electrolysis.

[Precipitation and Extraction of Lithium Carbonate]

According to one embodiment of the present invention, a concentrated lithium hydroxide aqueous solution can be formed when lithium ions move towards the cathode by the electrolysis. The solution may react with carbon dioxide gas or carbonate bearing materials to precipitate lithium carbonate with high purity. In other words, since the lithium hydroxide aqueous solution is a purified lithium rich aqueous solution from which impurities including magnesium, boron, and calcium are removed, the lithium hydroxide aqueous solution may be subject to reaction with carbon dioxide gas or carbonate bearing materials to precipitate lithium carbonate with high purity.

Then, the precipitated lithium carbonate may be filtered from the lithium phosphate aqueous solution to extract lithium carbonate, or in some cases, a step of washing may be additionally performed to increase the purity.

The concentrated lithium hydroxide aqueous solution obtained after the electrolysis may subsequently react with carbon dioxide gas to prepare lithium carbonate with a purity of 99.99% or higher.

The present invention is further illustrated by the following examples, although the following examples relate to preferred embodiments and are not to be construed as limiting on the scope of the invention.

Example 1

NaOH was added to a lithium bearing solution containing magnesium ions 20,000 ppm, boron ions 900 ppm, calcium ions 350 ppm, and lithium ions 900 ppm to precipitate magnesium hydroxide. While adjusting the pH of the lithium bearing solution, the surface charge of the precipitated magnesium hydroxide was measured. The results are shown in FIG. 1.

As shown in FIG. 1, the surface charge of the magnesium hydroxide was maintained with a positive charge when the pH range of the lithium bearing solution from which the magnesium hydroxide was precipitated was between 8.5 and 10.5. Accordingly, the boron ions with a negative charge were easily absorbed, and the positively charged lithium ions were prevented from being absorbed. This minimized the loss of lithium, and efficiently extracted both magnesium and boron at the same time.

Example 2

Various amounts of NaOH were added to a lithium bearing solution containing magnesium ions 20,000 ppm, boron ions 900 ppm, calcium ions 350 ppm, and lithium ions 900 ppm to precipitate magnesium hydroxide. The pH of the lithium bearing solution from which the magnesium hydroxide was precipitated was altered. Subsequently, a filtration was performed to separate the precipitated magnesium hydroxide from the lithium bearing solution. The filtrate was collected to measure the amount of magnesium, boron and lithium. The results are shown in FIGS. 2, 3, and 4, respectively.

Figure 2:
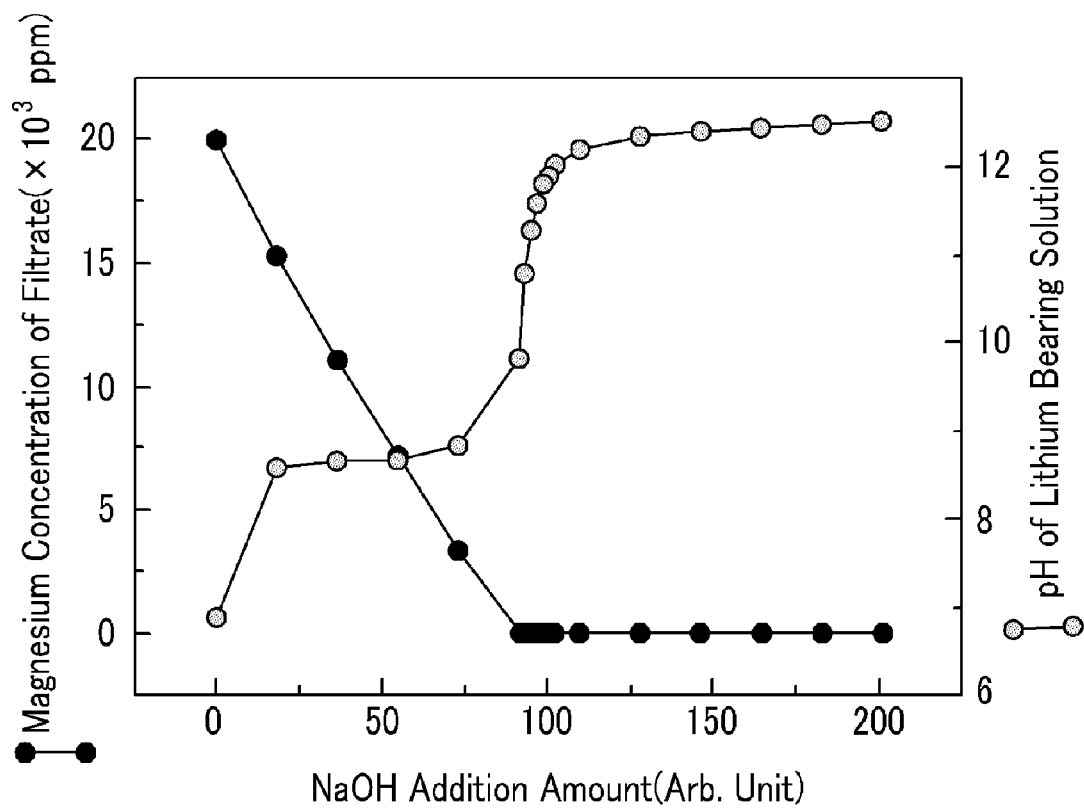
FIG. 2 is a graph depicting the concentration change of magnesium ions in the filtrate relative to the NaOH addition amount.

As shown in FIG. 2, an increase in the amount of NaOH added had no significant impact on the pH of the lithium bearing solution in the beginning, because OH– ion was used for the production of magnesium hydroxide. However, a continuous increase in the amount of NaOH gradually decreased the magnesium amount in the filtrate, and as the OH– ion increased, the amount of magnesium decreased to 4 ppm once the pH of the lithium bearing solution reached 9.8. This indicated that 99.8% of the magnesium ions dissolved in the lithium bearing solution were extracted.

Figure 3:
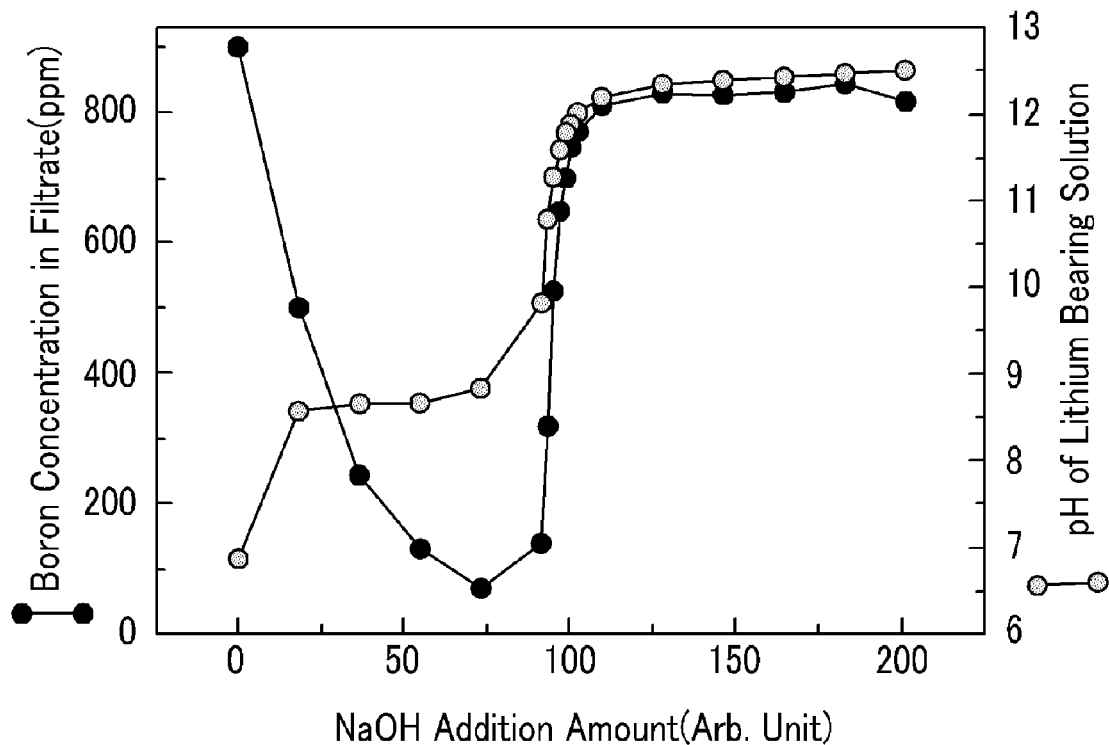
FIG. 3 is a graph depicting the concentration change of boron ions in the filtrate relative to the NaOH addition amount.

In addition, as shown in FIG. 3, the amount of boron ions dissolved in the lithium bearing solution initially decreased as the amount of NaOH added increased. This may be explained by the fact that the pH change could be insignificantly affected by the addition of NaOH in the beginning, and the surface charge of the magnesium hydroxide precipitated from the lithium bearing solution having a pH value of 10.5 or lower had a positive charge. Thus, the negatively charged boron ions present in the filtrate were precipitated while adsorbed on the surface of the magnesium hydroxide.

Figure 4:
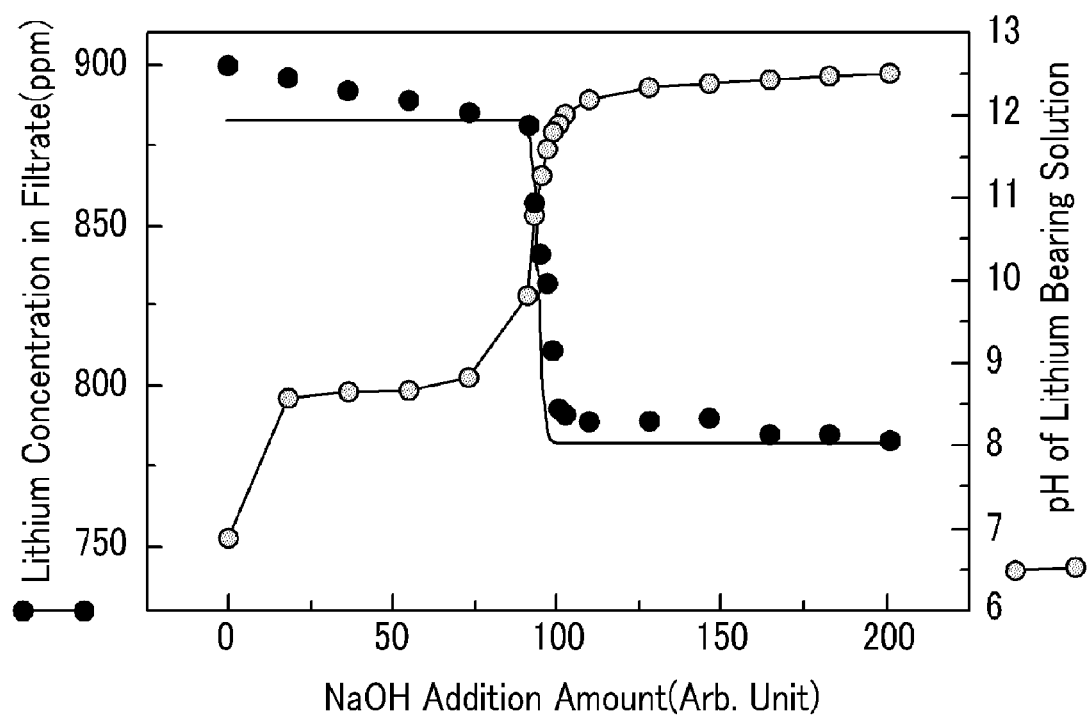
FIG. 4 is a graph depicting the concentration change of lithium ions in the filtrate relative to the NaOH addition amount.

As seen in FIG. 4, the amount of lithium ions present in the filtrate were initially not influenced by the added amount of NaOH. This could be explained by the fact that the positively charged lithium ions existing in the lithium bearing solution were not absorbed to the magnesium hydroxide because the surface charge of magnesium hydroxide had a positive charge in the beginning.

If an excessive amount of NaOH was added, however, the pH of the lithium bearing solution surpassed 10.5. Then, the surface charge of the magnesium hydroxide was converted to a negative charge and the negatively charged boron ions were not absorbed to the surface. Consequently, the concentration of boron ions existing in the filtrate dramatically increased. On the contrary, the concentration of positively charged lithium ions existing in the filtrate rapidly decreased as the lithium ions were absorbed to the surface of the magnesium hydroxide.

Accordingly, these results indicated that the added amount of alkali must be controlled to maintain the pH of the lithium bearing solution to be between 8.5 and 10.5 in order to extract magnesium and boron, while minimizing the loss of lithium from the lithium bearing solution.

Example 3

Various amounts of NaOH were added to a lithium bearing solution containing magnesium ions 20,000 ppm, boron ions 900 ppm, calcium ions 350 ppm, and lithium ions 900 ppm to precipitate calcium hydroxide from the solution containing calcium ions. A filtration was performed to separate the precipitated calcium hydroxide from the lithium bearing solution. The resulting filtrate was collected to measure the amount of calcium. The result is shown in FIG. 5.

Figure 5:
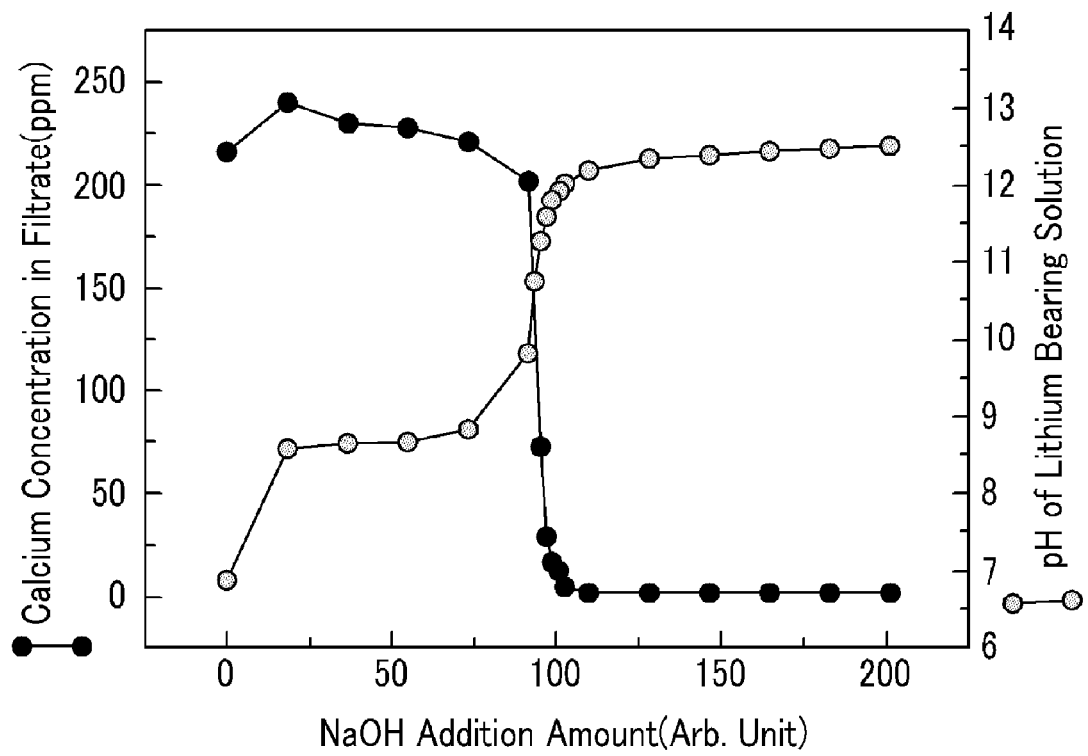
FIG. 5 is a graph depicting the concentration change of calcium ions in the filtrate relative to the NaOH addition amount.

As shown in FIG. 5, as the added amount of NaOH increased, the amount of calcium in the filtrate gradually decreased. When the pH of the lithium bearing solution reached 12, the amount of calcium was reduced to be 6.5 ppm, and 98% of the calcium ions dissolved in the lithium bearing solution was extracted. Accordingly, it is necessary to increase the pH of the lithium bearing solution to be at least 12 in order to enhance the extract yield of the calcium ions from the lithium bearing solution.

However, when the pH of the lithium bearing solution was prematurely adjusted to be at least 12 in the beginning, the surface charge of the precipitated magnesium hydroxide had a negative charge. This prevented the absorbance of the boron ions and caused the loss of lithium due to the absorbance of positively charged lithium ions. Prior to extracting calcium by adding alkali, the pH of the lithium bearing solution was adjusted to be between 8.5 and 10.5 so that the magnesium hydroxide having a positive charge was precipitated to prevent the absorbance of the lithium ions. Once the boron ions were absorbed, the simultaneous extraction of magnesium and boron was performed. Then, the pH of the lithium bearing solution from which magnesium and boron were extracted was adjusted to be at least 12 to precipitate the calcium hydroxide from the solution containing calcium ions.

Consequently, the magnesium hydroxide absorbed with the boron ions was extracted from the lithium bearing solution, and subsequently filtrated for its removal. Then, the pH of the lithium bearing solution was elevated to be at least 12 by adding an alkali or a carbonate into the remaining lithium bearing solution to extract calcium hydroxide. This allowed the preparation of a high purity lithium compound by economically extracting magnesium, boron and calcium from the lithium bearing solution.

Example 4

The impurities, including magnesium, calcium and boron, were removed from the brine, and 7.217 g/L of sodium phosphate was added to the remaining filtrate dissolved with the concentration of lithium ions being 0.917 g/L. The filtrate was maintained to be reacted for 15 to 60 minutes, while elevating the temperature to 90° C.

Once the reaction was completed, the precipitated lithium phosphate was separated by filtering, and the remaining filtrate was collected to measure the concentration of lithium. The result is shown in FIG. 6.

Figure 6:
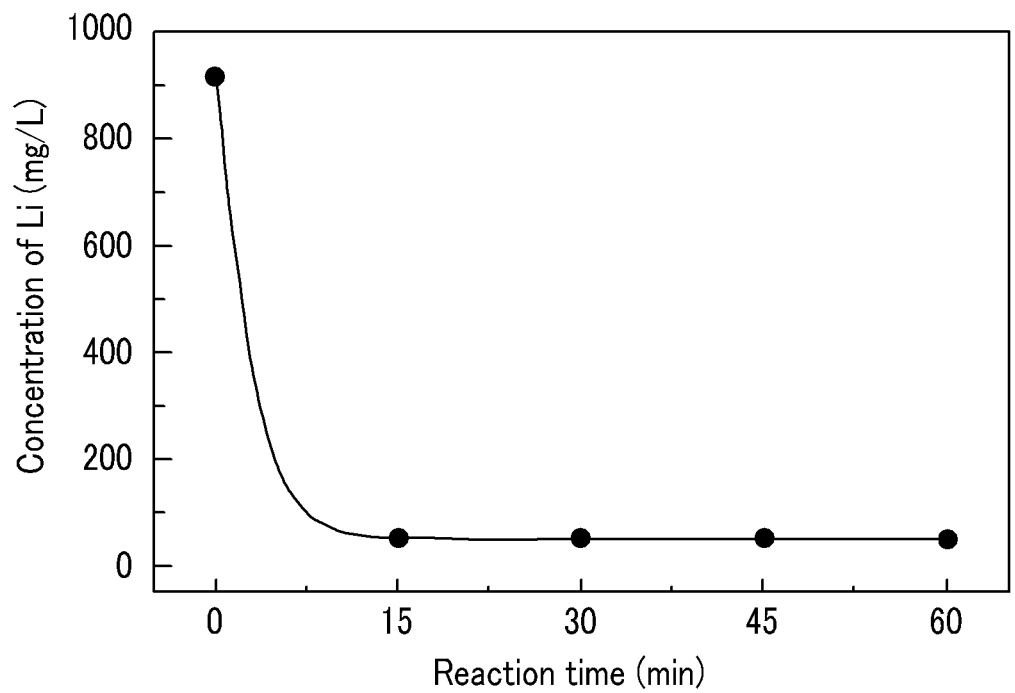
FIG. 6 is a graph depicting the concentration of lithium in the lithium bearing solution relative to the reaction time when lithium carbonate is precipitated from lithium.

As shown in FIG. 6, the concentration of lithium in the filtrate initially decreased dramatically when sodium phosphate was added to the brine. After the reaction time passed 15 minutes, the concentration of lithium in the filtrate came to be below 50 mg/L. This indicated that more than 95% of lithium dissolved in the brine was precipitated and separated as lithium phosphate.

Figure 7:
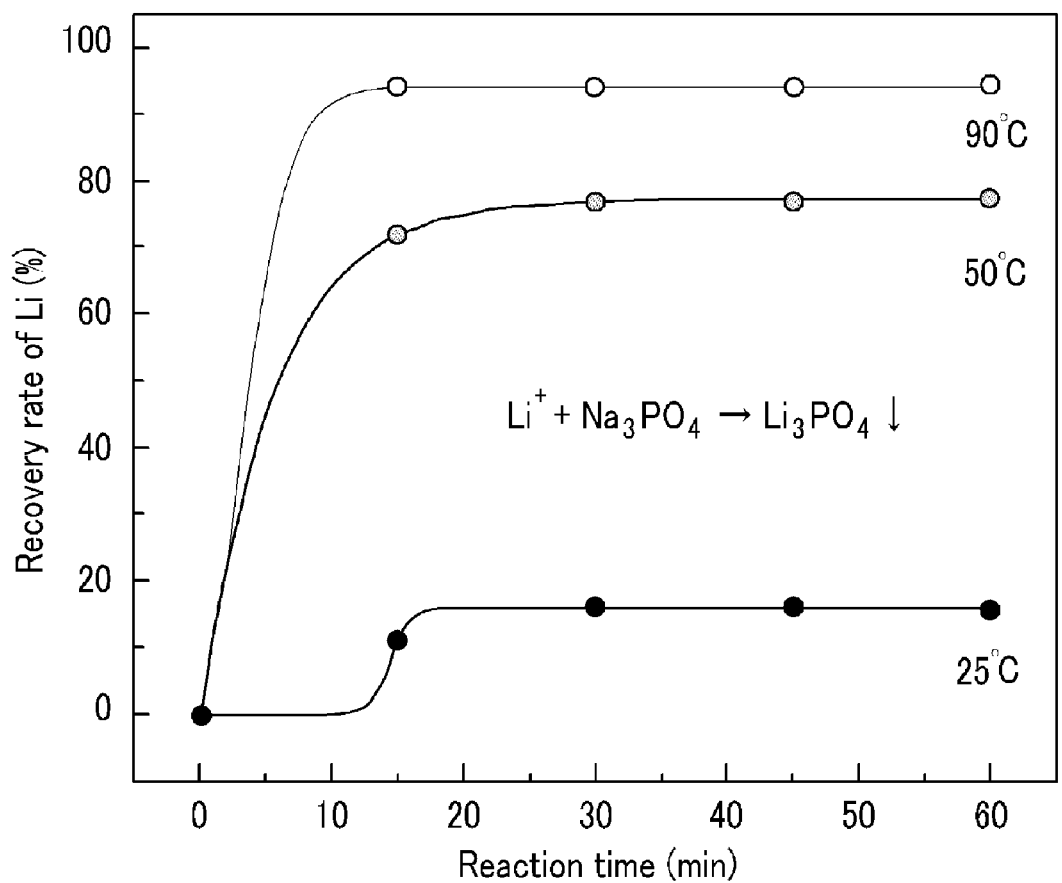
FIG. 7 is a graph depicting the concentration of lithium in the lithium bearing solution relative to the reaction time when lithium phosphate is precipitated from lithium.

Since the solubility of lithium phosphate is approximately 0.39 g/L, which is much lower than the solubility of lithium carbonate, adding a material including phosphorous, such as sodium phosphate, in the brine precipitated lithium phosphate in the form of solid from a small amount of lithium dissolved in the brine. In addition, as can be seen in FIG. 7, if the calcining temperature exceeded 90° C., the lithium extraction yield was more than 90% after the reaction time of 10 minutes, and the yield was more than 95% after 15 minutes.

Comparative Example 1

The impurities, including magnesium, calcium and boron, were removed from the brine, and 7 g/L of sodium carbonate was added to the remaining filtrate dissolved with the concentration of lithium ions being 0.917 g/L. The filtrate was maintained to be reacted for 15 to 60 minutes, while elevating the temperature to 90° C.

Once the reaction was completed, the precipitated lithium carbonate was separated by filtering, and the remaining filtrate was collected to measure the concentration of lithium. The result is shown in FIG. 8.

Figure 8:
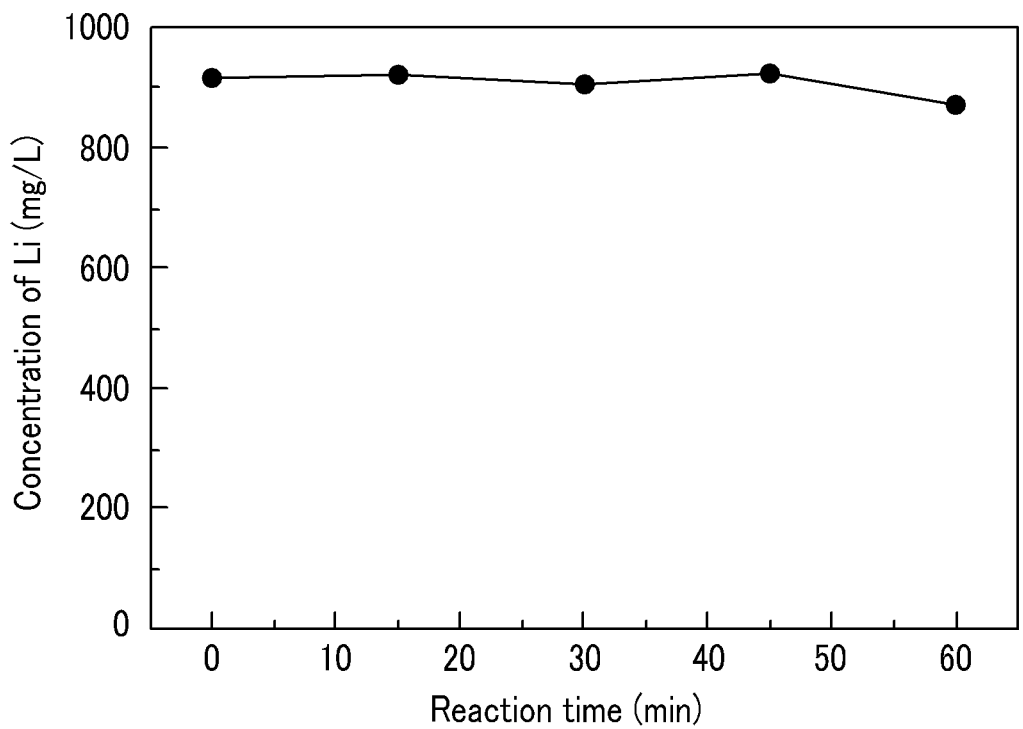
FIG. 8 is a graph depicting the concentration of lithium phosphate in the filtrate relative to the reaction time when lithium phosphate is precipitated from lithium.

As shown in FIG. 8, even if sodium carbonate was added to the lithium bearing solution, and reacted for 15 to 60 minutes, the concentration of lithium in the filtrate was almost identical to the concentration of lithium in the brine prior to the reaction.

In other words, due to its high solubility of approximately 13 g/L, a large amount of lithium carbonate can be dissolved in the water. Therefore, it would be extremely difficult to extract a small amount of lithium dissolved in the brine in the form of lithium carbonate, unless the precipitation amount of lithium carbonate is increased by evaporation and concentration of the brine.

By precipitating lithium dissolved in the brine by using lithium phosphate having a low solubility, the processes of evaporation as well as concentration of brine are not required, and the economical extraction of lithium with high extraction yield, while minimizing the loss of lithium, may be possible.

Example 5

Electrolytic chambers having an anode and a cathode separated from the anode by a cation exchange membrane were prepared. A carbon-based positive electrode was placed at the anode, and an iron-based negative electrode was placed at the cathode. A fluorine group having a sulphonic acid with pore density of 40% was used as the cation exchange membrane. As an electrolytic bath for the positive electrode, lithium phosphate aqueous solution having the lithium concentration of 15.77 g/L and the phosphorous concentration of 89.23 g/L were added at the anode. After adding de-ionized water at the cathode, the environment of each of the cathode and anode was regulated to be dried argon environment prior to electrolysis. Then, the electrolysis was performed under the electrolytic conditions of the electrolytic temperature of 20° C., and current density of 20 A/cm2.

The pH of the final solution at the cathode was 12.5, and no noxious chlorine gas was generated. Lithium metal having a purity of 99% or higher was obtained with the yield of 95% or higher.

Figure 10:
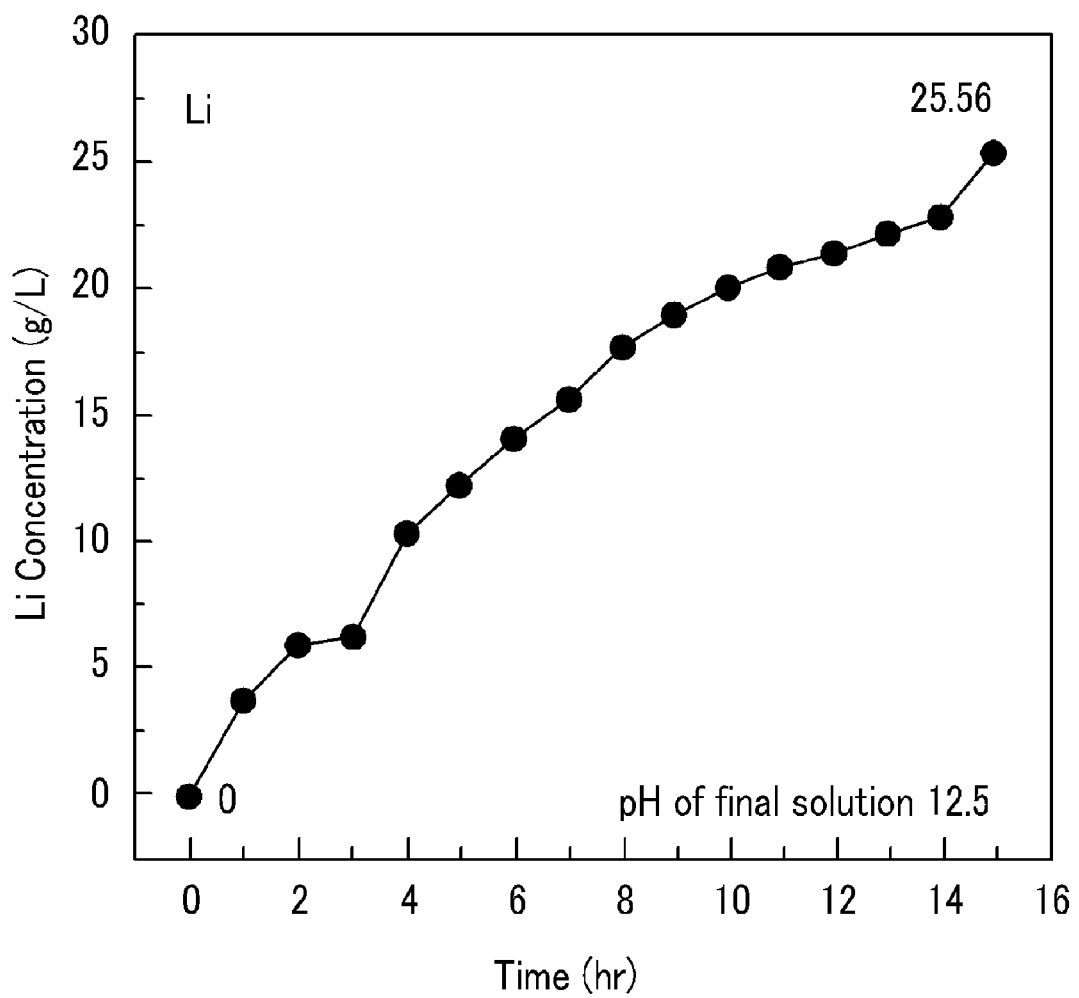
FIG. 10 is a graph depicting the change in lithium concentration with time.
Figure 11:
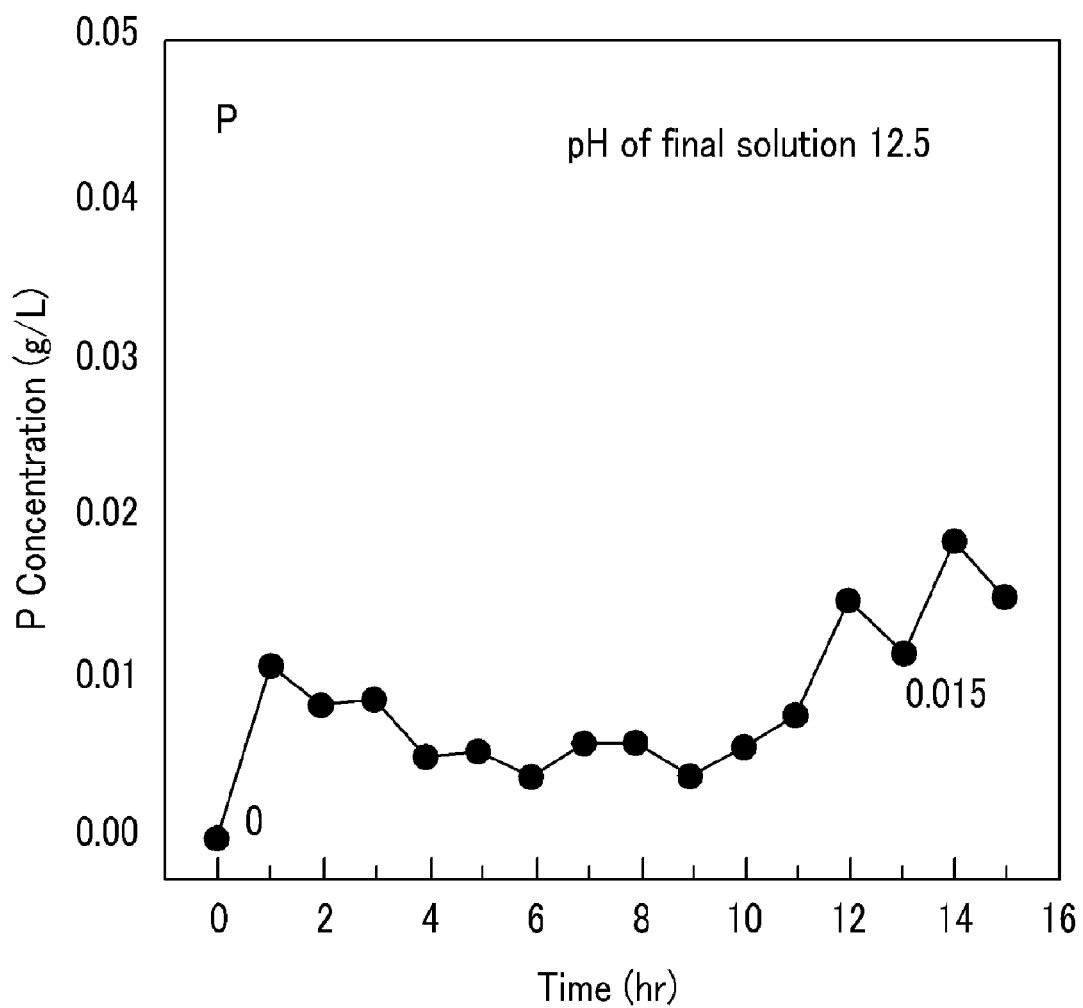
FIG. 11 is a graph depicting the change in phosphorous concentration with time.

The changes in lithium concentration and phosphorous concentration relative to electrolysis time were depicted in FIG. 10 and FIG. 11, respectively. After 15 hours of electrolysis, the lithium concentration was 25.56 g/L, and the phosphorous concentration was 0.015 g/L when the pH of the concentrated lithium solution at the cathode was 12.5. This confirmed that the phosphorous ions hardly moved, whereas most of the lithium ions selectively permeated through the cation exchange membrane and moved towards the cathode.

In the foregoing specification, specific embodiments of the present invention have been described. However, one of ordinary skill in the art will appreciate that various modifications and changes can be made without departing from the spirit and scope of the present invention as set forth in the various embodiments discussed above. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements as described herein.

What is claimed is:

1. A method of extracting high purity lithium from a lithium bearing solution by electrolysis comprising the steps of:
    preparing a lithium phosphate aqueous solution from the lithium bearing solution by adding a phosphorous supplying material; and
    extracting lithium from the lithium phosphate aqueous solution by electrolysis using an electrolytic device comprising an anode and a cathode separated from the anode by a cation exchange membrane,
    wherein the step of preparing a lithium phosphate aqueous solution from the lithium bearing solution by adding a phosphorous supplying material comprises the steps of:
    removing impurities comprising a step of adding an alkali in the lithium bearing solution to extract magnesium, boron or a mixture thereof and a step of adding an alkali, a carbonate or a mixture thereof in the lithium bearing solution from which magnesium and boron are extracted to extract calcium;
    extracting lithium phosphate by adding a phosphorous supplying material to the solution to precipitate lithium phosphate from the dissolved lithium; and
    preparing the lithium phosphate aqueous solution by dissolving the lithium phosphate in a phosphoric acid.

2. The method according to claim 1, wherein subsequent to adding the lithium phosphate aqueous solution at the anode, and de-ionized water in the cathode, current is applied to move lithium ions separated from the anode towards the cathode for the reduction of the lithium ions.

3. The method according to claim 2, wherein the anode and the cathode, during the electrolysis, are subject to being under an inert gas environment.

4. The method according to claim 3, wherein the inert gas is argon.

5. The method according to claim 2, wherein a solution concentrated by the movement of lithium ions towards the cathode is a lithium hydroxide aqueous solution.

6. The method according to claim 5, wherein the method further comprises a step of precipitating followed by extracting lithium carbonate by reacting the lithium hydroxide aqueous solution with carbon dioxide gas or a carbonate bearing material.

7. The method according to claim 2, wherein the pH of a lithium ion concentrated solution at the cathode after the electrolysis exceeds 7.

8. The method according to claim 1, wherein the electrolysis is performed under the conditions of current density in the range of 0.01 A/cm$^2$ to 0.075 A/cm$^2$, and electrolytic temperature in the range of 15° C. to 25° C.

9. The method according to claim 1, wherein the cation exchange membrane is porous having a pore density of 10% to 50%.

10. The method according to claim 1, wherein the cation exchange membrane is a polymeric membrane which allows the passage of cations.

11. The method according to claim 10, wherein the cation exchange membrane comprises at least one functional group selected from the group consisting of sulfonic acid group, carboxylic acid group, phosphonic acid group, sulfuric ester group, fluorine group and phosphate ester group.

12. The method according to claim 1, wherein the concentration of lithium in the lithium bearing solution is 0.1 g/L or more.

13. The method according to claim 1, wherein the step of removing impurities comprises the steps of:
  (a) adding an alkali in the lithium bearing solution to precipitate magnesium hydroxide from magnesium;
  (b) absorbing boron ions on the surface of the magnesium hydroxide by adjusting the pH of the lithium bearing solution to about 8.5 to about 10.5;
  (c) simultaneously extracting magnesium and boron by filtering the magnesium hydroxide absorbed with the boron ions from the lithium bearing solution; and
  (d) precipitating calcium hydroxide or calcium carbonate by adding an alkali, a carbonate or mixture thereof in the lithium bearing solution of step (c).

14. The method according to claim 13, wherein the steps from (a) to (c) are repeated at least twice.

15. The method according to claim 13, wherein the pH of the lithium bearing solution of the step (d) is adjusted to 12 or higher.

16. The method according to claim 1, wherein the phosphorous supplying material is at least one selected from the group consisting of phosphorous, phosphoric acid and phosphate.

17. The method according to claim 1, wherein the concentration of the lithium phosphate in the lithium bearing solution is 0.39 g/L or more.

* * * * *